(12) United States Patent
Sutherland et al.

(10) Patent No.: US 6,360,288 B1
(45) Date of Patent: * Mar. 19, 2002

(54) METHOD AND MODULES FOR CONTROL OF PIPELINES CARRYING DATA USING PIPELINES CARRYING CONTROL SIGNALS

(75) Inventors: Ivan E. Sutherland, Santa Monica; William S. Coates, Redwood City; Charles E. Molnar, deceased, late of Sunnyvale, all of CA (US), by Danna A. Molnar, legal representative; Robert F. Sproull, Newton, MA (US)

(73) Assignee: Sun Microsystems, Inc., Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/953,767

(22) Filed: Oct. 17, 1997

(51) Int. Cl.⁷ .............................................. G06F 13/00
(52) U.S. Cl. ...................... 710/100; 710/101; 712/200; 712/219; 370/351
(58) Field of Search .......................... 395/280; 712/200, 712/219; 370/351

(56) References Cited

U.S. PATENT DOCUMENTS

| | | | | |
|---|---|---|---|---|
| 4,679,213 A | * | 7/1987 | Sutherland | 377/66 |
| 5,187,800 A | * | 2/1993 | Sutherland | 395/800 |
| 5,325,495 A | * | 6/1994 | McLellan | |
| 5,421,028 A | * | 5/1995 | Swanson | 395/800 |
| 5,490,255 A | * | 2/1996 | Rawlinson et al. | 395/375 |
| 5,572,690 A | * | 11/1996 | Molnar et al. | 395/376 |
| 5,600,848 A | * | 2/1997 | Sproull et al. | 395/800 |
| 5,732,233 A | * | 3/1998 | Klim et al. | 712/200 |
| 5,737,614 A | * | 4/1998 | Durham et al. | 713/322 |
| 5,758,139 A | * | 5/1998 | Sutherland et al. | 395/559 |

* cited by examiner

*Primary Examiner*—Rupal Dharia
(74) *Attorney, Agent, or Firm*—Townsend and Townsend and Crew LLP

(57) ABSTRACT

A computer system is described in which control of the flow of data items in one pipeline is achieved using the values of control elements in another pipeline. Typically, each pipeline includes elements known as "places" and "paths," and the pipelines have special connections between them by which the data present in a place in a first pipeline can be used to control the disposition of data in the second pipeline. For example, the first pipeline can control the second pipeline to enable the addition, deletion, or steering of data items in the second pipeline.

18 Claims, 10 Drawing Sheets

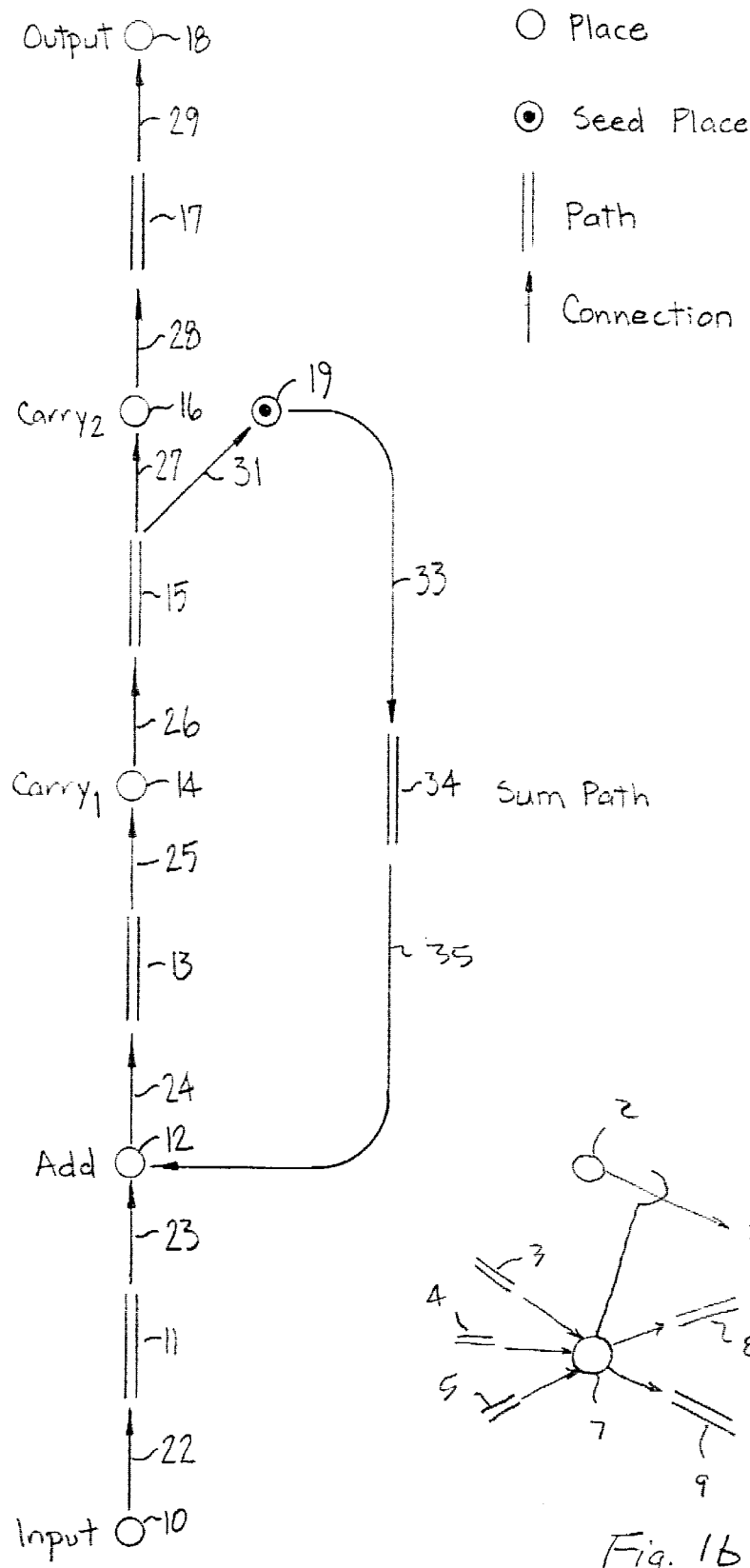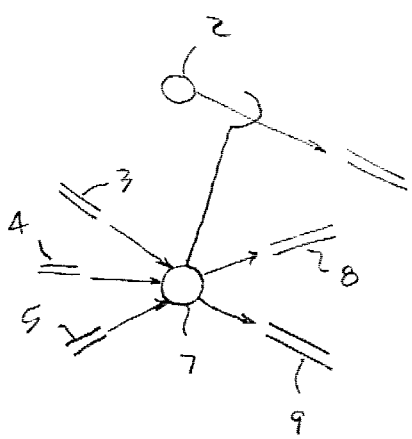
Fig. 1a
Fig. 1b

METHOD AND MODULES FOR CONTROL OF PIPELINES CARRYING DATA USING PIPELINES CARRYING CONTROL SIGNALS

BACKGROUND OF THE INVENTION

This invention relates generally to pipeline data processing systems, and more particularly, to asynchronous pipeline systems. Simple asynchronous pipelines are known, see, for example, U.S. Pat. No. 4,837,740, "Asynchronous First-In-First-Out Register Structure"; U.S. Pat. No. 4,679,213, "Asynchronous Queue System"; U.S. Pat. No. 5,187,800, "Asynchronous Pipelined Data Processing System"; and R. F. Sproull, I. E. Sutherland, and C. E. Molnar, *Counterflow Pipeline Processor Architecture*, Sun Microsystems Laboratories Publication No. SMLI TR-94-25, April 1994.

Complex pipelines are also possible. Such pipelines may branch and rejoin in many ways, or even be arranged in multi-dimensional structures. Data flowing through them may meet and interact with data items that precede or follow in sequence, or with data items flowing in a separate pipeline. For an example of a multi-issue pipelined processor, see U.S. patent application Ser. No. 08/853,970, filed May 9, 1997, and entitled "Multi-Issue/Plural Counterflow Pipeline Processor."

It has proven difficult to design complex asynchronous pipeline systems. The difficulty comes not only from their complex arrangements of circuits, but also from their complex behavior. One might deal with the circuit complexity alone; in other fields designers deal with circuits at least as complex. In an asynchronous system, however, any signal may occur at any time, constrained only by the explicit limitations placed on it by particular circuits. There is no arbitrary "timekeeper" or "clock" by which to measure circuit performance. Rather, the designer must account for all the possible sequences of behavior that may occur, assuring that no such sequence can cause a fault. Of course, this can be difficult.

The present invention provides techniques for the design of such asynchronous systems. The design is embodied, in part, as a set of modules which are rich enough to encompass a large range of systems, but simple enough to enable relatively easy use in design. The modules described herein are generic in the sense that they provide for a variety of a practical implementations, including combinatorial logic components, data pathways of desired width, and many different interfaces. Selection of "working sets" of modules is straightforward using known methods. Furthermore, each module is asynchronous. Each module starts the task for which it has been designed when instructed to do so by an adjacent module, and each module gives completion signals to adjacent modules to coordinate their actions. The modules fit together to form pipeline systems which provide particular utility in signal processors and general purpose microprocessors.

While one could assemble, with known Macromodules such as described in W. A. Clark, and C. E. Molnar, "Macromodular Computer Systems," *Computers in Biomedical Research* Vol. IV, Chap. 3, Academic Press, New York (1974), many different pipeline systems, systems designed with prior art modules are intrinsically slower. In addition, the large number of macromodules of prior art provided many more opportunities for implementation error. The present invention provides a set of modules adapted to assembling the most useful forms of a pipeline system. Compared to the macromodules, the present invention provides simplicity of design and ease of understanding, yet does not unduly limit the range of systems that can be assembled.

One project which employed modules for the design of processors is the TANGRAM design system. This system was developed in the Netherlands in the late 1980s and early 1990s. See, for example, Kaes van Berkel, *TANGRAM; Asynchronous Architecture for VLSI Programming*, Cambridge University Press (1993). TANGRAM modules directly implement the syntactic primitives appearing in statements written in the TANGRAM programming language for describing asynchronous systems. As with other modular structures, systems designed using the TANGRAM modules are considerably slower than desired.

The routing of data from a source pathway to selectable alternative output pathways according to data values found in the source pathway has been employed in prior art systems. One system which used this self-routing of data appears in the processor-to-memory switch of the BBN Monarch Multi-Computer. See, for example, Randall D. Rettberg, et al., "The Monarch Parallel Processor Hardware Design," *Computer* (April 1990), pp. 18–30. In the BBN system, address bits within packets control the routing of the entire packet containing those bits. Successive address bits control the routing at successive routing stages.

Another alternative pathway routing scheme was developed for the Mosaic system, see Charles L. Seitz, et al., "The Design of the CalTech Mosaic C Multicomputer," *Research on Integrated Systems; Proceedings* 1993 *Symposium*, MIT Press (1993), pp. 1–22. The Mosaic system differs from the BBN system in that although the routing information is contained within the packets themselves, it is encoded relative to the location of the switch node, rather than as an absolute destination address. In the Mosaic system each node increments the encoded information as it passes through. Only when the encoded value has achieved a certain net value is the entire packet switched to the alternate pathway. Neither the BBN Monarch system, nor the Mosaic system, used the principle of controlling data routing in one pipeline by control bits carried in another pipeline.

SUMMARY OF THE INVENTION

There are several aspects to the present invention. A first aspect deals with control of the flow of data in one pipeline system on the basis of control information flowing in another pipeline system. It is often important to modulate the flow of data items in a pipeline. For example, one may wish to eliminate certain data items from the stream flowing through a pipeline according to their values. Alternatively, one may wish to steer certain data items into one branch of a pipeline system and other data items into another branch, again according to their values. For example, one may wish to process positive numbers in one branch and negative numbers in another branch. Prior pipeline systems have been able to eliminate or steer values in a pipeline according to information traveling within the pipeline itself, as in the Monarch and Mosaic systems. The present invention provides an additional capability to enable control of the flow of data items in one pipeline according to the values of control elements in another pipeline. As will be described, in embodiments of the invention, both the pipeline being controlled as well as the pipeline providing the control are asynchronous pipelines in the sense that events and operations occur in the pipelines whenever they are ready, not in accordance with externally supplied clock signals.

In one embodiment according to our invention, a system includes a first composition of places and paths to form a first pipeline having information flowing therethrough, and a second composition of places and paths to form a second pipeline also having information flowing therethrough. The terms "Places" and "Paths" have a special meaning as will be described below. The second pipeline has at least one place with a special connection to at least one place in the first pipeline. In such a system the information flowing through the first pipeline is used to control the disposition of information flowing through the second pipeline.

A second aspect of the present invention involves the control of data latches in the primary data paths of an asynchronous pipeline. It has been common practice to include the latch control circuits inside the asynchronous control loop of each stage of the pipeline. See, e.g., I. E. Sutherland, "Micropipelines," *Communications of the ACM* (June 1989). A system with latch control circuits inside the asynchronous control loop follows a known "bundled data convention." According to the bundled data convention a "bundle" consisting of data signals and a validating event signal, often called "request," are designed to have controlled delay such that the data signals always reach their final logic levels prior to arrival of the request. Thus, arrival of the request guarantees validity of the data signals. For a further discussion of bundled data conventions, see *Introduction to VLSI Systems,* C. Mead and L. Conway, Addison-Wesley Publishing Co. (1980), pp. 252–254.

To achieve greater speed, the present invention places such latch control circuitry outside the asynchronous control loop, thereby increasing throughput. Placing latch control circuitry outside the loop increases throughput, not only by reducing the amount of circuitry inside the loop, but also by permitting the latch control logic to operate concurrently with the asynchronous control loop. Thus, the present invention modifies the bundled data convention to guarantee only that the data signals will be valid a known interval after arrival of the request. The request signal thus becomes the herald of data to come, rather than a certification of data already present.

In this case an embodiment according to our invention includes a system in which there is a control path wherein request signals and acknowledge signals flow in a control loop, the request signals flowing in one direction, and the acknowledge signals flowing in an opposite direction, and a data path in which data flows. A control element is provided in the data path to regulate the flow of data therethrough, and a control circuit external to the control loop is connected to provide signals to the control element and connected to receive the request signals and the acknowledge signals from the control path as those signals flow through the control path, and in response thereto control the control element.

To illustrate these aspects of the invention, a complete set of modules, symbols for representing them, and rules for connecting the modules to each other are described herein. As will be described, the modules feature high-speed operation. This high speed results, in part, from removing from the asynchronous control loop much of the logic required to control the latches in their primary data paths. The asynchronous control circuits in these modules can act slightly in advance of the data transfer operations, enabling the data transfer to occur more rapidly than would be possible for systems with latch control logic inside the asynchronous control loop. Were the latch control logic inside the loop, further actions in the loop would have to await the actions of the latch control.

The set of modules described may be flexibly configured. Their flexibility comes from inclusion of modules specifically intended to control the flow of data in one pipeline according to "command bits" carried as data in another pipeline. Because control of flow in a pipeline is an explicit task centralized in a specific module, systems that would otherwise be difficult to analyze and design become easily defined arrangements of interconnected modules. This makes a large range of modular systems possible, adding to the range of designs for which the modules are suitable. Interlocks included within the modules provide correct relative timing of operations to control which events occur, and to ensure that operations occur in proper sequence.

The family of modules described below can be broadly classified as three main module types: Places, Paths and Ports. For this reason we term the design system and notation we have developed for representing the modules as P**3, and pronounced "P cubed." The particular module set described herein is intended to be exemplary. Those of ordinary skill will be able to design other sets of modules encompassing the concepts disclosed herein.

Another important feature of the modules describe herein is the one-to-one correspondence between the symbolic representation of a system and its circuit diagram. Each of the symbols representing a module describes a specific circuit. The symbolic representation has the advantage that where symbols connect in the symbolic representation, circuits connect in the physical implementation. Thus, the translation from symbolic representation to circuit topology can be more reliably achieved. This enables automated design techniques to be used in creating systems employing the modules.

"Transition logic" appears in the control circuits of the family of modules described. Each event is represented as a change in a logic level, also known as a "transition," independent of the actual logic level involved. Rising transitions from LO to HI carry the same meaning as falling transitions from HI to LO. Although transition logic is well known, it is not the only possible representation of events. Other representations of events may also be employed. Corresponding to each such representation, a designer skilled in the art might equally well practice the present invention.

BRIEF DESCRIPTION OF THE DRAWINGS

FIG. 1a is a diagram in P**3 notation of a pipelined accumulator;

FIG. 1b illustrates the concept of a junction;

DESCRIPTION OF THE SPECIFIC EMBODIMENTS

Figures 2A, 2B:
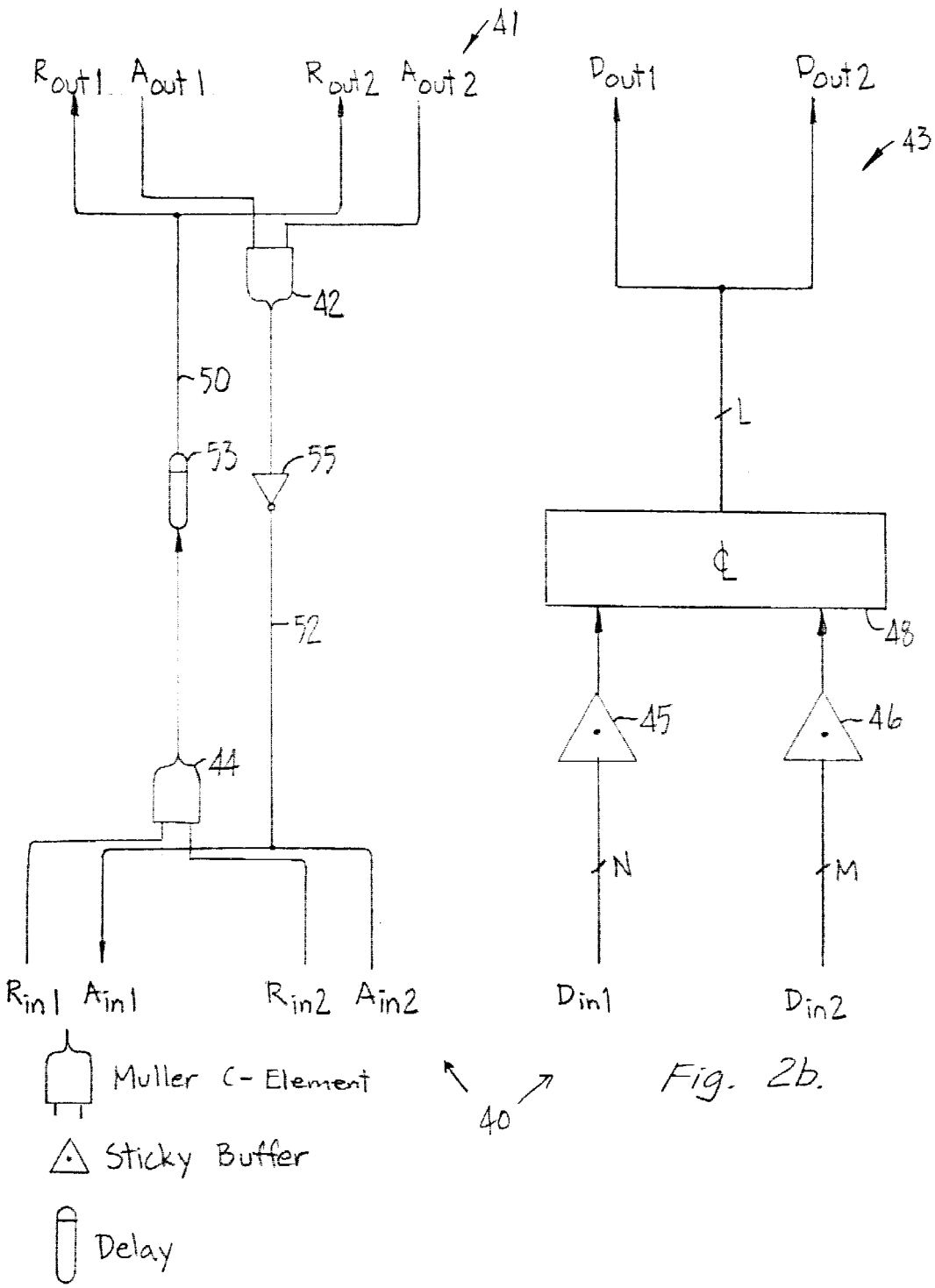
FIG. 2a is a diagram which illustrates the control part of a Place module.
FIG. 2b is a diagram which illustrates the data part of a Place module.

To assist in understanding the present invention, an example is discussed first. FIG. 1a is a diagrammatic representation of a particular pipeline accumulator using P3 notation. P3 notation is explained further below and is the notation employed throughout the Figures herein for the purpose of representing the various modules, their interfaces and their internal functionality. The pipeline accumulator illustrated in FIG. 1a calculates the sum of the values of a stream of data items presented from below at the Place labeled "Input." The example in FIG. 1a illustrates five Place modules 10, 12, 14, 16, 18 in a pipeline arrangement and one Seed Place module 19. The figure also illustrates a series of Path modules, that is, Paths 11, 13, 15, 17, 34. The functionality and circuitry of the Paths and Places modules is explained in connection with later figures.

The Path modules and the Place modules are joined by arrowhead line connections such as 22, 23, 24 . . . 35. These arrowheads do not necessarily denote additional circuitry. For example, connection 31 represents attachment of an output interface of Path 15 to the input interface of Seed Place 19. Similarly, connection 33 represents attachment of the output interface of Seed Place 19 and the input interface of Path 34. These connections merely attach terminals at an input interface to like terminals at an output interface. Place 12 has two input connections 23 and 35, and Path 15 has two output connections 27 and 31. As explained below in connection with their particular circuits, Paths and Places can accommodate as many input or output connections as desired.

The direction of the arrowhead on the connections such as connection 25 is significant. Although the symbols for Paths and Places avoid distinction between input and output, each nevertheless has distinct input and output interfaces. The direction of the arrowheads on the connections reveals which interfaces are which. The arrowhead end of a connection attaches to an input interface of a Path or a Place, while the tail end of a connection attaches to an output interface of a Path or a Place. Thus, the output of a Place always connects to the input of a Path, while the output of a Path always connects to the input of a Place. In later examples it will be seen that intermediate Control Ports may be introduced between Paths and Places and between Places and Paths. While the arrowheads represent the direction of flow of the data through the system, the flow of acknowledge signals, which are used to notify a sender that its data have been received, will proceed in the opposite direction.

In the exemplary pipeline accumulator of FIG. 1a, the addition function is broken into three parts. Place 12, labeled ADD, contains logic for a preliminary addition, forming partial sums that pass through Path 13 to Place 14, labeled Carry1. Place 14 contains logic circuits for a preliminary carry step. The partially completed values from Place 14 pass on via Path 15 to both Place 16 and Place 19, labeled jointly Carry2. These Carry2 Places complete the addition, each forming the same completed value. Place 16 passes its sum via Path 17 to Place 18, providing the next accumulated value as output. Place 19 passes its sum, which has the same accumulated value, back along the bypass route formed by Path 34 to reenter the ADD Place.

Because it receives data from both the input Place 10 and the bypass route Path 34, the ADD Place 12 gets both fresh input data from Path 11 as well as the accumulated sum from Path 34. In each of its cycles, Place 12 adds the fresh partial result value to the accumulated sum and passes the result forward via Path 13 to Place 14.

The dot inside Place 19 denotes that Place as a "Seed Place." This indicates that initially it contains a data item, presumably zero, that is the initial value for the accumulation. After initialization, this data item will become the first value fed back through Path 34. The other Places are initially empty.

Each of the elements depicted in FIG. 1a is responsible for its own timing. A fresh data item may be introduced into Place 10 whenever that Place is free to accept it. That increment will then participate in the accumulation process, with its value ultimately being added to the running sum to produce a new accumulated sum value. Similarly, an accumulated data item may, whenever present, be removed from Place 18, thus rendering that Place again able to accept a new value. The accumulator shown in FIG. 1a will perform its function as fast as it can, considering when fresh data are available to it in Place 10 and when there is space in its output Place 18 for a new answer. If no fresh data are available, the accumulator will wait for data. If no space is available at the output Place 18, the accumulator will wait for removal of the previous data.

FIG. 1b is a simplified P**3 diagram to illustrate the concept of a junction. In the figure a series of circuits beginning with Paths 3, 4, 5 converge on a single Place 7. From the Place 7 emerge two circuits culminating in Paths 8 and 9. Place 7 can be considered a junction for the various circuits. At such a junction, the data stream entering the junction will consist totally of data items and NULL elements. NULL elements are the absence of data items. Importantly, using the techniques described herein, control of the data items may be applied at the junction. At the junction, or at any Place, data items may be inserted into the data stream, data items may be deleted from the data stream and/or the data stream may be steered as desired. Herein we use the term "disposition" to refer to the capabilities of insertion, deletion, or steering.

FIG. 1b also illustrates how at the junction 7 one may control the disposition of data. As shown there, data passing through Place 7 controls the disposition of the data passing through Place 2. The control of the disposition of the data items in Place 2 is achieved by configuring Place 7 as an Output Control Port or an Input Control Port. Such ports are described in detail below in conjunction with FIGS. 6, 7, 8, 13 and 14. The control capability of the ports is represented by the hook extending from Place 2, and this functionality is also discussed below.

FIG. 2a illustrates the control part 41 of the Place module 40, while FIG. 2b illustrates the data part 43 of the Place module 40. As shown in FIG. 1a, the symbol for the Place module is a circle. The Place module 40 has two states, EMPTY and FULL, and these are each described below. A Place, other than the Seed Place described below, is initially in the state known as EMPTY. The Place may have a plurality of input interfaces and a plurality of output interfaces as are described below, but in FIG. 2a and 2b, two input interfaces and two output interfaces are shown for illustration.

A connection to a Place may be drawn to enter or leave the circle symbol at any location on its periphery. Such a connection with an entering arrowhead connects to an input interface of the Place, while such a connection with an exiting arrow connects to an output interface of the Place.

The control part 41 of the Place module is shown in FIG. 2a and consists of two separate pathways. The first pathway 50, concerning request signals which have the initial designation R, goes generally upward in FIG. 2a. The second pathway 52, concerning acknowledge signals which have the initial designation A, goes generally downward in the figure.

The shield-shaped circuit element 44 in FIG. 2a is the Muller C-element. This known device follows a simple rule of behavior: when its two inputs are HI, its output becomes HI; When its two inputs are LO its output becomes LO. If the states of its inputs differ, it retains its previous logical output state. The Muller C-element contains one bit of storage. Initially, as a result of a master clear signal, not shown in the illustration, all Muller C-elements are forced to have a LO output. For transition logic, the Muller C-element serves the function of logical AND because the output of the Muller C-element changes only when both its first input AND its second input change. Generalizations of the Muller C-element to three or more inputs are well known.

In FIG. 2 the Place module is shown having two input interfaces, represented by the dashed lines at the bottom of the figures, and two output interfaces, represented by the dashed lines at the top of the figure. The control and data circuits of the Place module illustrated respond to a plurality of input interface signals, Rin1, Rin2, Din1, and Din2, and to a plurality of output interface signals, Aout1 and Aout2. The control and data circuits generate a plurality of signals at the input interface and at the output interface Ain1, Ain2, Rout1, Rout2, Dout1, and Dout2. Although only two input interfaces and two output interfaces appear in the figure, any number of interfaces of either kind might be used.

Signals D (data), R (request) and A (acknowledge) at an input interface carry the notation "in" followed by an index number designating the input interface in question, e.g. Rin1 is the request (R) signal at the first input interface. Similarly signals D, R, and A at the output interface carry the notation "out" followed by an index number designating the output interface in question, e.g. Aout1 is the acknowledge signal at the first output interface. Notice that Aout is a logical input at a Place on the output interface, and Ain is a logical output at an input interface. The terms "in" and "out" in these signal names refer to which kind of interface they belong to rather than to their direction of logical flow. In some cases we refer to the signal designation without the index designation to mean such signals collectively.

In the upward pathway from Rin to Rout in FIG. 2a, the Muller C-element 44 produces an output event only after all Rin signals have announced an input event. Each Rin signal indicates that its interface has data available for the Place to accept and process. FIG. 2 illustrates only two Rin signals, Rin1 and Rin2, but any desired number of Rin signals may be employed.

When all Rin signals, for example Rin1 and Rin2, have arrived, the Place may act. A delay element 53 is shown. This delay device may be of any known form. The amount of the delay introduced must match or exceed the combined delay of the "sticky buffers" 45, 46 and the combinatorial logic circuit 48 in the data portion (FIG. 2b) of the Place module. Because of delay circuit 53, an event signal traveling from Rin to Rout will take longer than any of the data bit signals traveling from Din to Dout. Thus, the output event signals Rout1 and Rout2 appear an appropriate time after input event signals Rin1 and Rin2, allowing time for the combinatorial logic to function. Event signals Rout1 and Rout2 indicate that the Place module has completed its processing function and that the module 40 is ready to deliver data to the next module. Although FIG. 2a illustrates only two Rout signals, as with the input signals any desired number of output signals Rout1 and Rout2 can be provided.

The second pathway 52 in the control part of the Place module concerns the acknowledge (A) signals, and goes generally downward in the figure. This pathway 52 begins with a Muller C-element 42 near the top of the figure, which fires only after the Place module has received Aout event signals from all of its output interfaces. The Aout event signals indicate that the next module has taken responsibility for the output data from this Place and therefore that the Place may obtain new data from its source or sources. The "next" module is not shown in the figure, but is positioned above the module shown in FIG. 2, in the same relationship as Place 16 and Path 17 in FIG. 1a. The Place module 40, in turn, produces a change in the level of its Ain signals, indicating to its predecessor modules that module 40 is ready for new data.

The second pathway of the control circuitry also contains a logical inversion driving the Ain1 and Ain2 signals. Because the Ain signals are logical outputs at the input interfaces of the Place module, in some implementations of the modules this logical inversion requires only an interchange of "true" and "complement" signals already available at the Aout interfaces. The inverter 55 shown represents a logical complement and not necessarily a circuit composed of active elements. The function of the inversion is to produce an extra event on the Ain terminals, when the circuit is initialized, to indicate that the Place is initially EMPTY.

The Place receives fresh data whenever every input Rin presents one event signal. The modified bundling convention for the data bits requires that the data coming in as Din always arrive in a known time relationship to the corresponding event Rin. In some versions of the modules described herein, data items Din arrive just before the corresponding event at Rin. It is also possible to use modules for which there is a known time relationship between the arrival time of data Din and the corresponding event signal at Rin. For example, in one implementation of the modules data at Din follow corresponding events Rin by a time that is always less than 1 nanosecond (or other fixed interval). When the Place has data available at its output terminals as Dout, it supplies an event signal Rout, indicating that the output data are available. As above, however, there must be a known time relationship between the availability of data, Dout, and the event signal Rout. After the Rout event has occurred, the Place is said to be "FULL."

When a subsequent pipeline element accepts the data from the Place module, it will so indicate by providing an event signal on the Place's Aout terminal. Recall that Aout is a logical input at the Place's output interface. Through the logical inversion 55, the Place delivers this event signal to its input interface, as its output signal Ain. After the event Ain, the Place is again said to be EMPTY. Because transition logic is used, the Place is said to be FULL if Rout and Ain match in level, and EMPTY if they differ. Changes in Rout and Ain alternate, rendering the Place alternately FULL and EMPTY. As mentioned above, a Place is initially EMPTY.

FIG. 2b illustrates an embodiment of the data portion of the Place module. Data input from Din1 consists of N bits on N separate connections, as indicated by the slash mark and label N. Similarly data input from Din2 consists of M bits on M separate connections. The input signals first are supplied to a "sticky buffer" 45, 46 each represented in the drawing as an amplifier symbol with a dot inside. These sticky buffers retain whatever value they are given at the input interface even when the circuits driving Din cease driving it actively. One known implementation of a sticky buffer is an amplifier with weak positive feedback.

Following the sticky buffers 45, 46, the Place contains optional combinational logic, represented as the box 48. This combinational logic may perform any non-storage logic function desired, such as addition, shifting, negation, logical OR, rearrangement of bits, selection of sub-elements of the word, encoding, decoding, and so forth, or no function at all. The number of bits at the output interfaces is L, as symbolized in the drawing by the slash mark and the label L. Depending on the specific function implemented in a particular Place module, the number of output data bits L appearing at an output interface as Dout may be the same, larger, or smaller than the total number of input data bits at the input interfaces. Some or all bits may be used or left unattached at any or all of the output interfaces.

Figure 3:
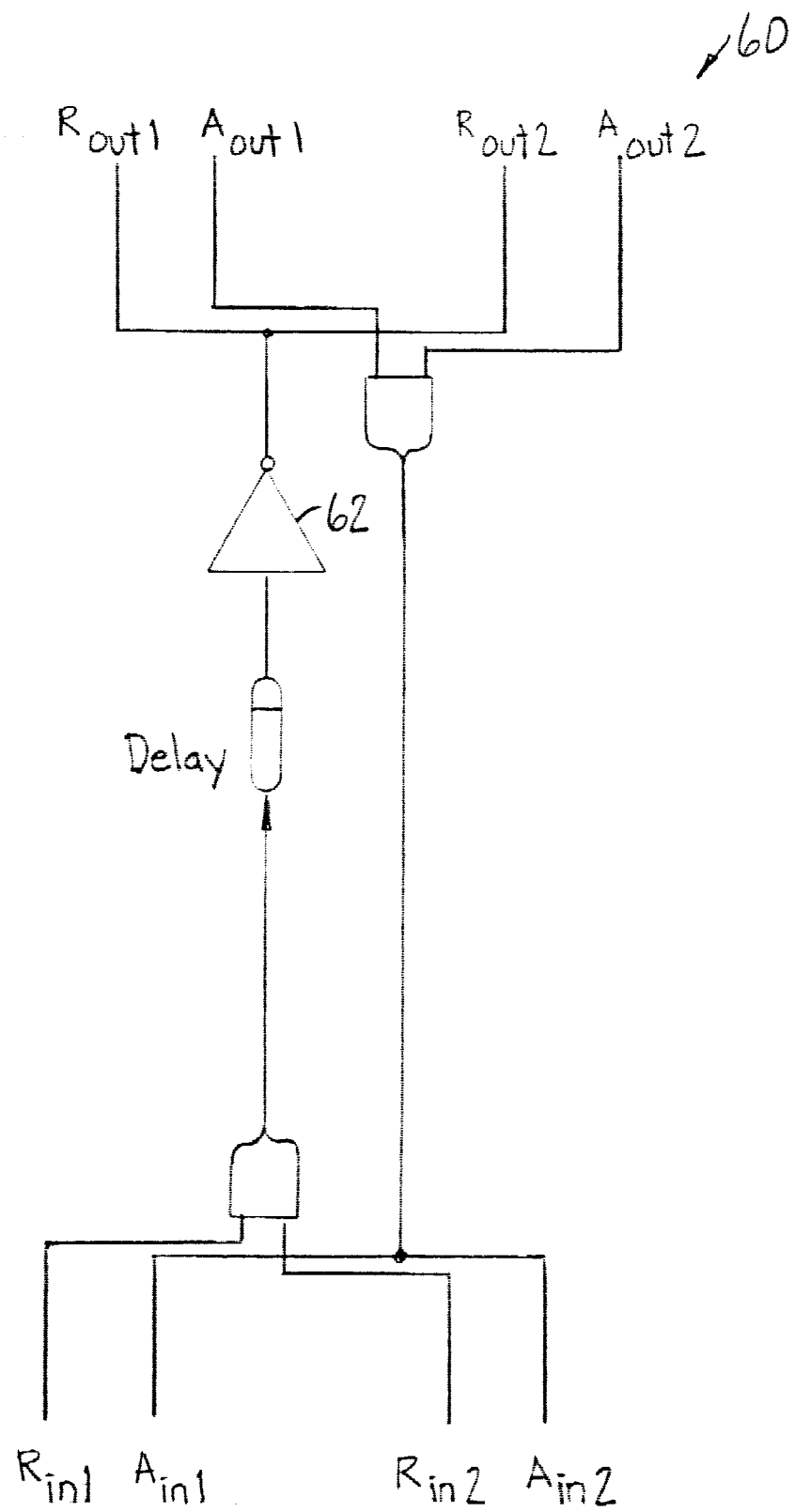
FIG. 3 is a diagram which illustrates the control part of a Seed Place module.

FIG. 3 shows the control logic for a Seed Place module. The symbol for the Seed Place is marked with a dot to distinguish it from a Place. The dot indicates that the Seed Place is initially FULL. The only difference between the circuits for a Seed Place module and a Place module is the position of the logical inversion in the control circuit. As shown in FIG. 2, in the Place module the logical inversion 55 lies between Aout and Ain. As shown in FIG. 3, in the Seed Place module the logical inversion 62 lies between Rin and Rout.

The purpose of the logical inversion is to provide initialization for the Seed Place. Because in transition logic a transition represents an event, such a logical inversion creates an initial event at start-up. Whereas the Place module makes this initial transition appear as Ain, indicating to modules "below" it in the pipeline that it is EMPTY and ready to receive a value, the Seed Place module makes this initial transition appear as Rout, indicating to modules "above" it in the pipeline that it is FULL and able to pass data forward. Of course, alternative means can be used to provide such initialization. For example, an XOR gate with an initialization event signal could be used. The data path for the Seed Place may be the same as that in FIG. 2b, or it may provide means to set the sticky buffers to an initial value when commanded by an initialization event.

Figure 4:
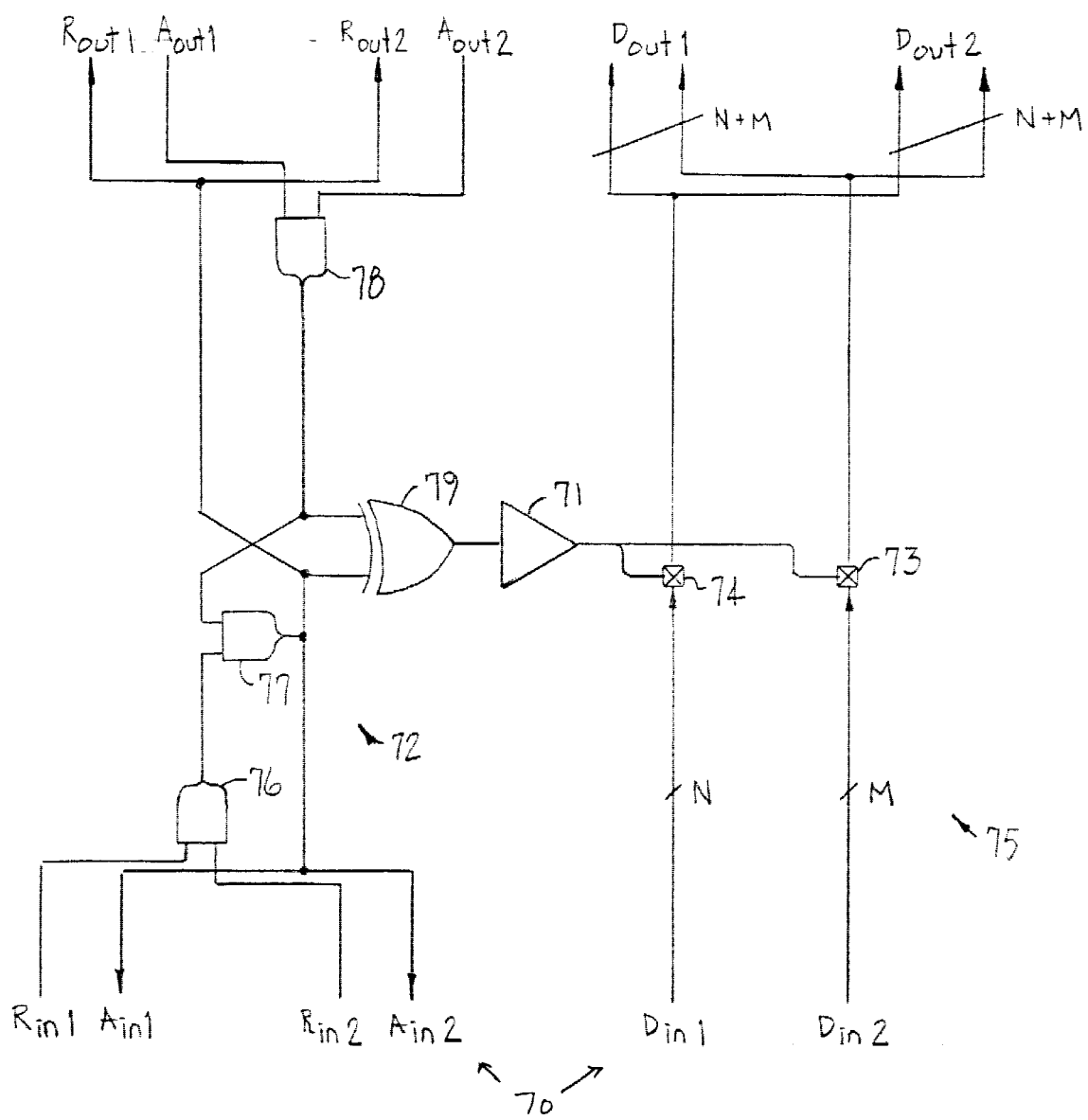
FIG. 4 is a diagram which illustrates the control part and data part of a Path module.

FIG. 4 illustrates the control portion 72 and data portion 75 for a Path module 70. As explained in conjunction with FIG. 1, the symbol for a Path module is a pair of closely spaced parallel lines. These lines can be made as long as desired, and even curved. Like the Place module, the Path module may have a plurality of input and output interfaces. In the same manner as previously described for other modules, the control and data circuits shown generate a plurality of signals at the input interface and at the output interface Ain1, Ain2, Rout1, Rout2, Dout1 and Dout2. Again, although only two input and two output interfaces appear in the figure, any number of input or output interfaces might be used.

The data part of a Path module consists only of pass gates 73, 74 or equivalent circuits. In one state of the Path, referred to as "transparent," these pass gates conduct signals. In the other state of the Path, called "opaque," these pass gates block signals. The Path alternates between its transparent and opaque states, passing a data item each time it becomes transparent. The pass gates in the Path, together with the sticky buffers in the next Place form a latch.

The control part of the Path consists of two types of logical elements, an XOR function 79 and Muller C-elements 76, 77, 78. The interconnection of three Muller C-elements appearing in FIG. 4 is equivalent to the alternative provision of a single Muller C-element with four input connections. Furthermore, if only one input interface were used, the lower Muller C-element 76 could be omitted without changing the circuit function. A similar rearrangement applies to the output interface if only a single output interface is used. Initially, as a result of a master clear signal, not shown, all Muller C-elements are forced to have a LO output.

The XOR gate 79 provides a signal to control the pass gates 73, 74 in the data pathways. An amplifier 71 may be required to provide sufficient drive for a large number of pass gates if large numbers of data bits pass through the Path. In the figure the "slash N" and "slash M" designation indicate that these communication circuits pass N and M bits respectively. Thus, although only two pass gates appear in the figure, N+M of them are implied.

It is important to recognize the isolation of the XOR 79 and the amplifier 71 from the asynchronous control loop in the Path module 70. Wires carrying the signals Rin and Ain connect through a Place module "below" the Path module to wires carrying the signals Rout and Aout of the Path module below it. As will be seen later, this makes a complete control loop around which events travel. The speed at which events can traverse such a loop limits the cycle time of the asynchronous system. Notice that the XOR and the amplifier are not a part of this loop, but rather form an appendage to it. The separation of the latch driving circuits from the control loop is discussed further below. Thus, the actions of the XOR and the amplifier can proceed concurrently with the actions of the Muller C-elements 76, 77, 78 in the Path Module and concurrently with the actions of the elements of the adjacent Place modules. Although only one line is shown connecting the XOR to the amplifier and to the pass gates, the signal from XOR to the pass gates often provides both true and complement wires to drive the two-transistor CMOS pair in the usual form of pass gate. Thus, the XOR renders the path transparent every time input Aout announces an event, and opaque every time the Muller C-element fires.

In a complex composition of modules, the input interface of a Path connects to the output interfaces of one or more Places, called the Path's "input Places." The output interface of the Path will connect to the input interfaces of one or more Places, called the Path's "output Places."

The Path module acts to move data from its input Places via Din1 and Din2 to its output Places via Dout1 and Dout2. The output Places indicate that they are EMPTY by signals Aout1 and Aout2 from the successor module. This fires the upper Muller C-element 78 in the Path module, causing the XOR circuit 79 to render the Path module transparent, thus permitting the data to flow from the input Places through the Path to the output Places.

According to the bundling convention, data thus flowing through a Path may change without effect until each of its input Places indicates that the data it offers are valid. The input Places indicate data validity by presenting an event signal to the Path module on its Rin terminals. When all of the Path's input Places indicate that their data are valid, the Path has an event signal on each of its Rin terminals, and its lower Muller C-element 76 will fire. This in turn permits the central Muller C-element 77 to fire, rendering the Path opaque and trapping the final data item in each of its output Places.

A Path's input Places may indicate that fresh data are valid before its output Places are ready for it. When that happens, the Path remains opaque until its output Places are free. When they are, the Path becomes transparent momentarily, passing the fresh data to its output Places, thereupon returning to opaque status. How long the Path is transparent in depends on the relative delays in the central Muller C-element 77, the XOR 79 and the amplifier 71. The design of these components is chosen to make this interval of transparency adequate to pass a fresh data item.

Whenever the central Muller C-element in a Path module fires, it accomplishes two things. First, by way of Rout, it indicates to its output Places that they now have valid data, rendering them FULL. Second, by way of Ain, it indicates to its input Places that they are now EMPTY and are therefore free to accept new data items.

Figure 5:
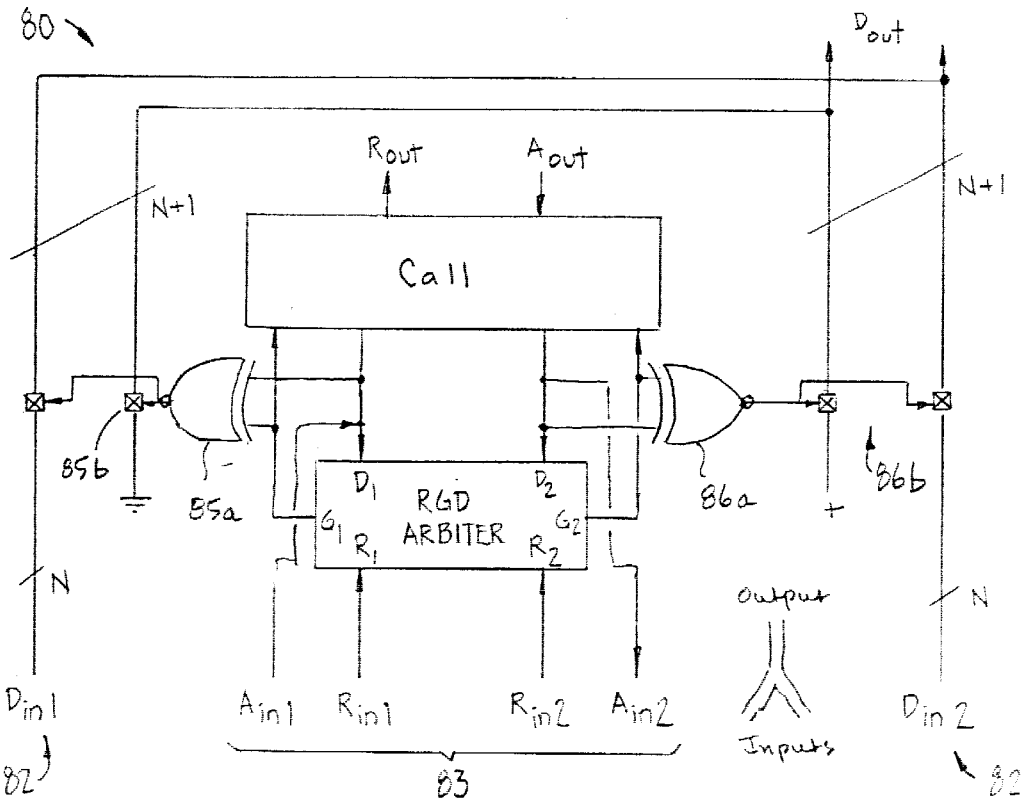
FIG. 5 is a diagram which illustrates the control part and data part of a Demand Path module.

FIG. 5 illustrates a Demand Path module 80, including a Demand Path symbol, a data portion 82 and a control portion 83. Like a Path symbol, the Demand Path symbol consists of narrowly spaced lines. The Demand path symbol, however, is split into two parts at its input end, which is at the bottom of the symbol. Thus there are two input interfaces to the Demand Path Module. Unlike other modules with multiple interfaces, however, these serve special functions including arbitration.

FIG. 5 also illustrates signals Rin1, Ain1 and Din1 associated with the first input interface. Also shown are Rin2, Ain2 and Din2 associated with the second input interface. A request-grant-done (RGD) arbiter receives the Rin1 and Rin2 signals and chooses only one, even if signal events occur on both together. In response to the chosen input, the RGD arbiter produces an event signal, or GRANT, on its output nodes G1 or G2. This GRANT event enters the XNOR gate 85a (or 86a) and renders one set of pass gates 85b (or 86b) in the Demand Path module transparent, passing the chosen input data value forward to the Dout. The demand path module differs from the simple path module in that its connection from Din1 or Din2 to Dout is normally opaque, becoming transparent only when used. Notice that the signals to Dout, one coming from the left input Din1 and one from the right input Din2 are carried on the same output wires. A known CALL element 88 passes the GRANT event along as an Rout signal, indicating to the subsequent Place that data are available on the Dout terminals. When the subsequent Place indicates that it is ready for fresh data, it produces an event signal on the Aout terminal. The CALL element routes this to the proper side of the RGD arbiter as a done signal, D1 or D2. The design of an RGD arbiter is known. See Ivan E. Sutherland, "Micropipelines," 1988 Turing Award Lecture, *Communications of the ACE* (June 1989), Vol. 32, No. 6. The done signal also goes to the XNOR 85a (or 86a) to render the pass gates 85b (or 86b) in the Demand Path module again opaque. The done signal also goes to the proper input interface as Ain1 (or Ain2) as the case may be, indicating that the transaction is complete. The done signal to the RGD arbiter permits it to make another grant if a further request is pending.

The Demand Path module 80 appends an additional bit to its output data item. Most of the output data bits come from input terminals Din1 or Din2, but the extra bit is produced internally in the Demand Path module 80. The extra bit of data is indicative of which input interface the Demand Path module chose as the source of data for this cycle.

Figure 6:
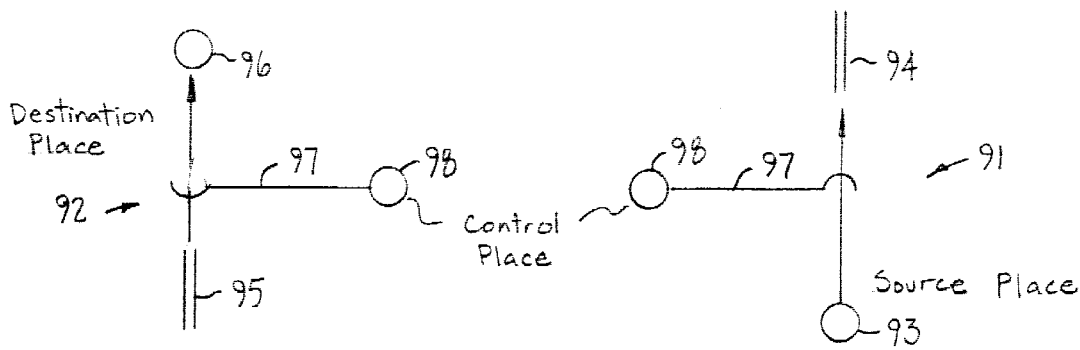
FIG. 6 is a diagram which illustrates two types of Control Port module.

FIG. 6 illustrates the Control Port Module. There are two forms of Control Port module, one form 91 for output from a Place 93 to a Path 94 and one form 92 for input from a Path 95 to a Place 96. Symbols for these two forms appear in FIG. 6. Notice that the names are given with respect to the controlled Place: the Input Control Port 92 accepts input from a Path 95 and delivers it as input to the associated Place 96. The Output Control Port 91 takes information from the output of a Place 93 and delivers it to a Path 94. Unlike other modules, a Control Port specifically requires three interfaces. The third interface, called the Control Interface, is an input interface that connects to an output interface of a Place. A Control Port attaches to two Places, which must be distinguished. Herein we call one its "Control Place" and the other either its "Source Place" or its "Destination Place," depending on whether the Control Port is an Output Control Port or an Input Control Port respectively.

The symbols for the Control Port have two parts, an arrow and a hook 97. The arrow, drawn pointing up in the figure, represents the "through" path from input interface to output interface. For an Input Control Port 92 the arrow connects a Path to a Place; for an Output Control Port 91 the arrow connects a Place to a Path. The hook, drawn with the open end toward the Place, represents the control portion of the Control Port. The end of the hook connects to the Control Place 98 of the Control Port. The Input Control Port 92 has a Control Place 98 and a Destination Place 96. The Output Control Port 91 has a Control Place 98 and a Source Place 93. The purpose of the Output Control Port is to deliver only selected data items from its Source Place 93 to a Path 94. It rejects other data items, removing them from its Source Place 93 without delivering them to the associated Path 94. Whether or not the Output Control Port 91 delivers a particular data item depends on the corresponding data item given to it by its Control Place 98. When the Output Control Port 91 rejects a data item, the associated Path 94 is kept unaware of the transaction.

The purpose of the Input Control Port 92 is to overwrite the data in its Destination Place 96 selectively with data items from an associated Path 95. When overwriting, the Input Control Port 92 waits for the Path to proffer a data item and for its Destination Place 96 to be EMPTY. It then copies the data item into its Destination Place 96. Unlike the Output Control Port, which drops data items not passed, the Input Control Port 92 either overwrites the new data item into its Destination Place 96 or refills the Place with the existing data item already there. When the Input Control Port preserves the existing data item, the associated Path 95 is kept unaware of the transaction.

The Output Control Port 91 can act only when data are available to it from both its Source Place 93 and its Control Place 98. Both Places will be FULL when the Output Control Port acts. Depending on the value in its Control Place 98, the Output Control Port 91 either delivers or does not deliver the data from its Source Place 93 to the associated Path 94. In either case, the Output Control Port 91 indicates to both its Source Place 93 and its Control Place 98 that it has consumed the data items they had made available, rendering them both EMPTY and able to accept new data items for the next cycle of controlled operation.

The Input Control Port 92 can act only when data are available to it from its Control Place 98, which must be FULL while its Destination Place 96 is EMPTY. Depending on the value in its Control Place 98, the Input Control Port 92 either copies new data into Destination Place 96 or preserves the former data item. In either case, the Input Control Port 92 indicates to its Control Place 98 that it has consumed the control data item rendering the Control Place EMPTY and indicates to its Destination Place 96 that fresh data are available to it, rendering it FULL whether or not the "fresh" data is just a reinstatement of the former data or is new data from the associated Path 95.

Figure 7:
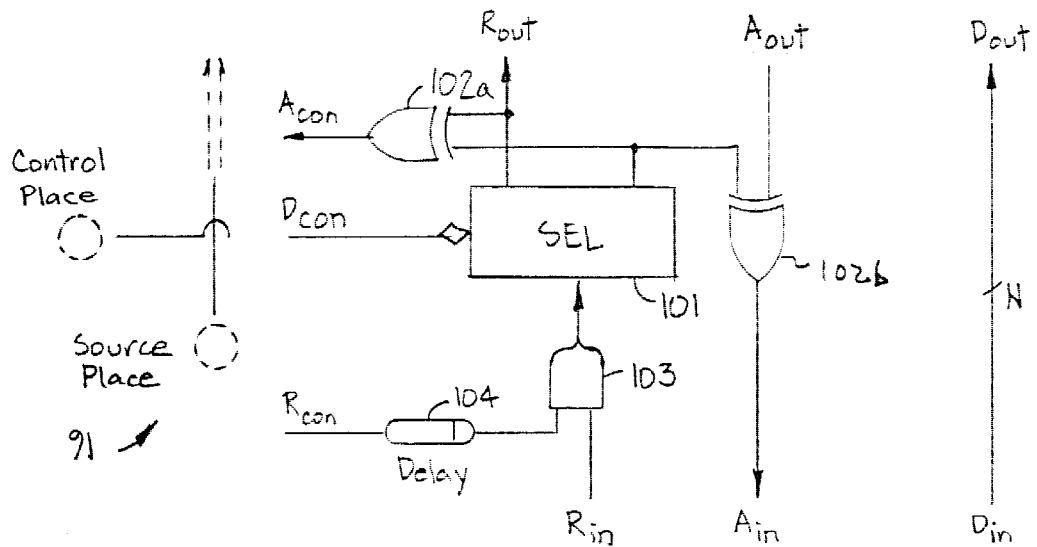
FIG. 7 is a diagram which illustrates the control part and data part of an Output Control Port module.

FIG. 7 illustrates an embodiment of the Output Control Port. The data part of the Output Control Port module 91 from its input interface to its output interface consists only of wires that pass the data through the module. A single data bit labeled Dcon from the associated Control Place, however, controls a SELECTOR element circuit 101, labeled SEL in the figure. The SELECTOR element circuit 101 is, for example, as described in U.S. patent application Ser. No. 08/665,154 filed Jun. 13, 1996, entitled "Symmetric Selector Circuit for Event Logic." The SELECTOR circuit is a circuit that steers input events to its left or right output terminal depending on the state of the input logic level Dcon, shown here as an open diamond arrow. Thus, the value coming from the Control Place causes the SELECTOR element to deliver its input event signal Rin to either to the Rout terminal, or "looping back" via the XOR circuit 102b to the Ain terminal.

Timing for the Output Control Port module is done by the Muller C-element 103, which combines the Rin signal and the delayed version of Rcon signal. When both Rin and Rcon terminals have received event signals, data are available from both the input Place and the Control Place, and the Output Control Port can then act. The Acon signal announces an event, rendering the Control Place EMPTY regardless of which way the SELECTOR element sends its input event signal (the XOR 102a provides the logical OR function for transition events). The SELECTOR element, however, decides whether to send the request signal onward from the Rin terminal to the Rout terminal, or instead to "loop back," returning the event signal from the Rin terminal immediately to the Ain terminal without ever activating the associated Path.

Figure 8:
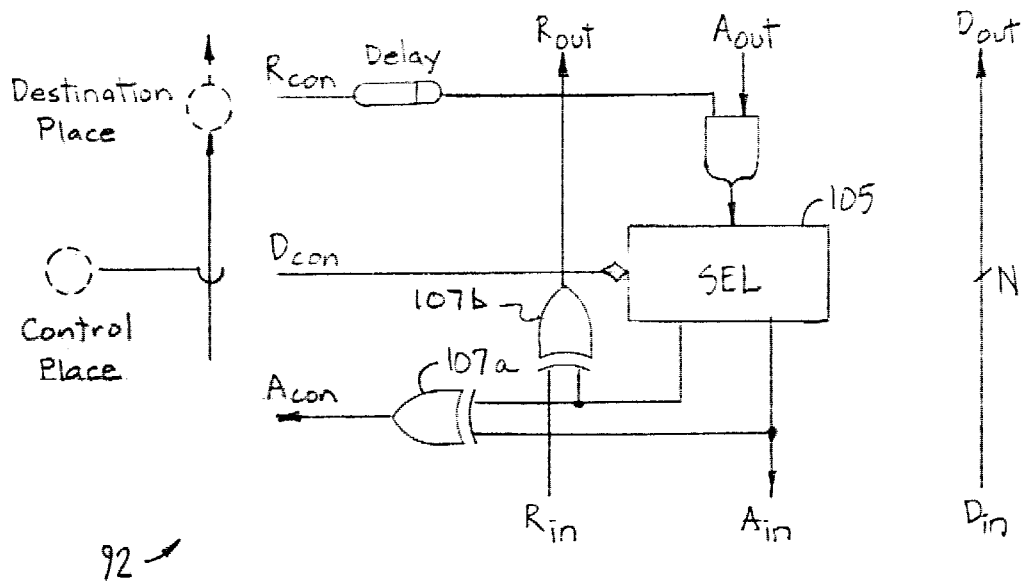
FIG. 8 is a diagram which illustrates the control part and data part of an Input Control Port module.

The Input Control Port module of FIG. 8 is much like the Output Control Port of FIG. 7 except that it connects a Path to a Place. Recall that the open end of the hook on the symbol for an Input Control Port faces the Place. This is to remind us of the loop-back capability of the Input Control Port. In the Input Control Port the SELECTOR element 105 lies in the acknowledge signal pathway from the Aout terminal to the Ain terminal. One output of the SELECTOR element passes the signal through from the Aout terminal to the Ain terminal, whereas the other output "loops back," passing the signal from the Aout terminal back via the XOR 107b to the Rout terminal without ever activating the Input Control Port's input interface which is connected to the output interface of the adjacent Path. Which route the Input Control Port chooses is established by the control bit presented to it from its control input Place on the Dcon terminal of its control interface. Note that this control bit is just a data bit, so far as the control input Place is concerned.

The Input Control Port can act only when its Control Place provides it with a control bit at its control interface via the Dcon terminal, and also delivers an event signal on the Rcon terminal signifying that the data bit is available. In addition the Destination Place associated with the Input Control Module must be EMPTY, as indicated by an event signal on the Aout terminal. In this respect the Input Control Port differs from the Output Control Port, which requires that both its Control Place and its Source Place be FULL.

The modules described above can be connected into many different configurations. Such combinations are referred to herein as a "composition" of the modules. In some compositions certain parts of one or more modules may prove unnecessary. For example, when a module herein, such as a Place module, shown in FIG. 2 requires only a single input interface, the Muller C-element that combines the inputs may be omitted. Such local optimization not only reduces the total amount of equipment required to realize the composition, but also may make the composition operate more quickly.

Figure 9:
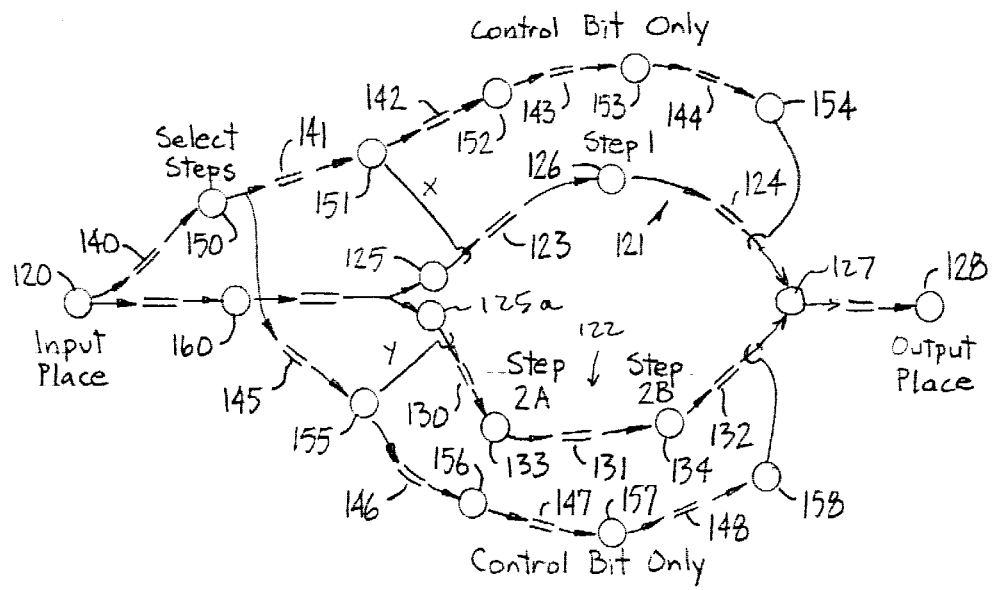
FIG. 9 is a diagram which illustrates a pipeline with upper and lower routes of doing different processing on chosen values.

FIG. 9 illustrates the use of both Input Control Ports and Output Control Ports. The purpose of the circuit illustrated is to perform different processing tasks on different data items according to their values as they appear in an incoming data stream supplied at Place 120. To accomplish the different tasks the stream is passed from Place 120 to Place 160, following which it is divided selectively into two streams 121, 122, one stream for performing each of the separate tasks. The tasks are represented by "Step 1" in the upper path 121, and "Step 2A" and "Step 2B" in the lower path 122. When the tasks are completed the streams 121, 122 are recombined at Place 127 and thence to the output place 128, restoring the original order of the data items.

The upper processing route 121 comprises Paths 123 and 124, and Places 125, 126, and 127. The lower processing route comprises Paths 130, 131, and 132 and Places 125a, 133, 134, and 127. Notice that the lengths of these two processing routes are unequal, though they might be of equal length or not as the processing tasks require. The figure also shows a control routes comprising Paths 140, 141, . . . 148, and corresponding places.

In general terms, this interconnection of modules works by computing in Place 120 which of the two processing routes 121, 122 is appropriate to each data item. Data bits that encode the choice to be made (for example, the sign bit and its complement) pass from Place 120 to Place 150 and thence to Places 151 and 155 which are Control Input Places of the Output Control Ports X and Y. The two Output Control Ports X and Y, use those control bits to specify the route through which the data items themselves will flow. For each data item one of the Output Control Ports passes the data item and the other does not. Thus, the pair of Output Control Ports routes the data item into the proper processing pathway.

The harder part is to reestablish the data items in their original order after the separate processing tasks have been completed. Each time Place 127 becomes EMPTY and seeks new data, the Input Control Ports with Destination Place 127 get the route-selection information appropriate to the next data item in the original sequence. Only one of these Input Control Ports acts to take data from its Path; the other avoids overwriting the new data thus delivered. Place 127 combines the data from the two routes to produce the final output.

Figure 10:
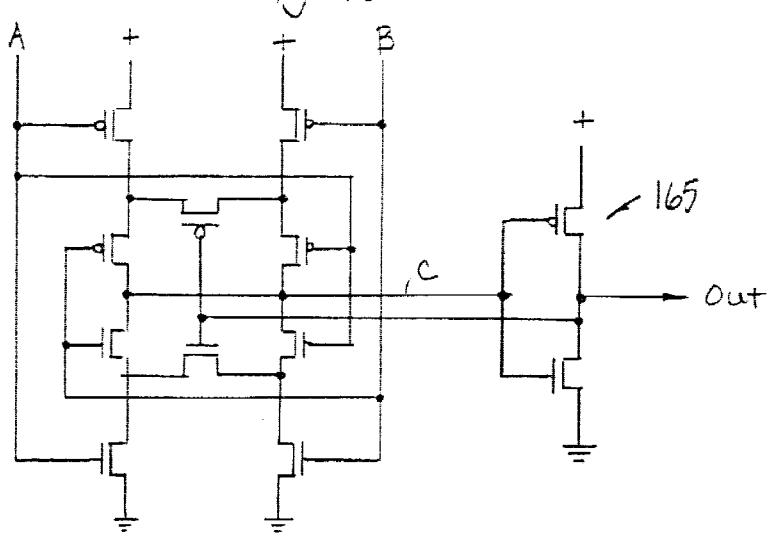
FIG. 10 is a diagram which illustrates a known embodiment for a Muller C-element.

FIG. 10 illustrates an embodiment of a known Muller C-element such as shown schematically in the modules depicted in FIGS. 2, 3, 4, 7, and 8. At the left of FIG. 10 is an inverting majority circuit with input nodes A and B, and output node C. This drives the inverter 165 shown at the right of the figure. The inverter 165 provides current drive at the output OUT. When both A and B inputs are LO, OUT becomes LO. When the A and B inputs are HI, then OUT becomes HI. If A and B differ, then OUT casts the majority vote and retains its previous value.

Figure 11:
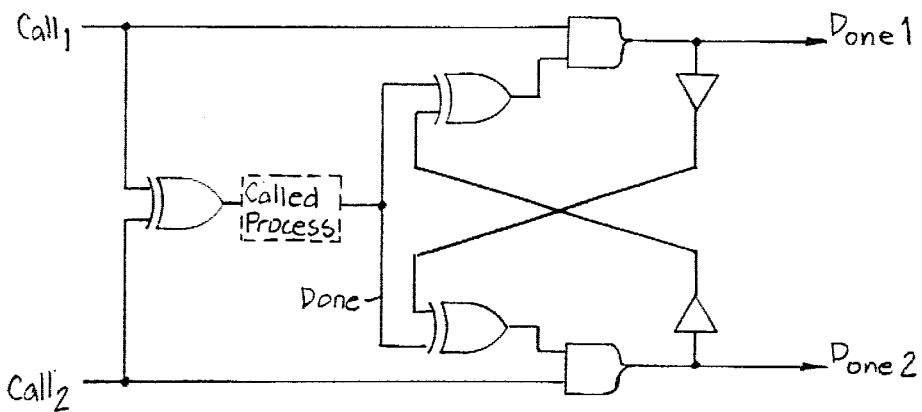
FIG. 11 is a diagram which illustrates a known embodiment for a CALL element.

FIG. 11 illustrates a known embodiment of a CALL circuit such as shown schematically in FIG. 5.

Figure 12:
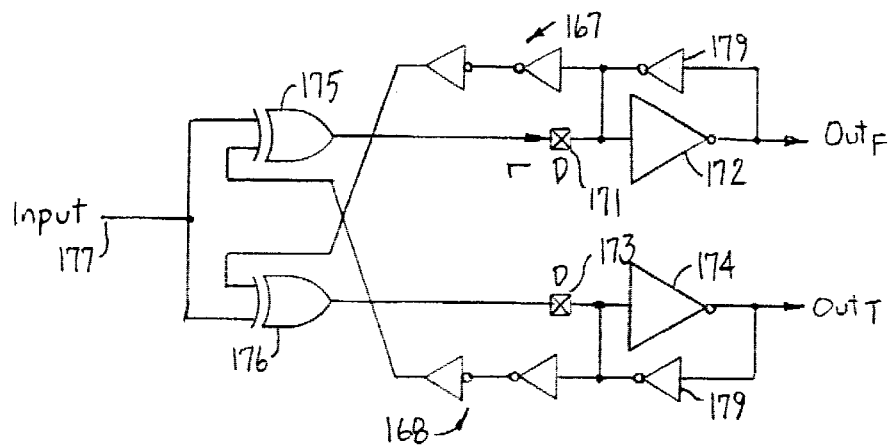
FIG. 12 is a diagram which illustrates a known embodiment for a Selector element.

FIG. 12 illustrates an embodiment of a known SELECTOR element. The SELECTOR element comprises two latches, pass gates 171, 173 and following inverter/drivers 172, 174, and two XOR gates 175, 176. One latch is made transparent, and the other opaque, by the action of data input signal D and its complement − supplied to the pass gates 171, 173. When an event signal arrives at the input 177 it changes the input signals to both latches. Only the transparent latch changes output value, which through the feedback amplifiers, causes the XOR to remove the change signal from the opaque latch.

Analysis of the local timing constraints in the preferred embodiment of the SELECTOR element permits some simplification of the generic Control Port circuits shown in FIGS. 7 and 8. In particular, the Acon XOR of the generic Control Port circuits, which takes its inputs from the two outputs of the SELECTOR element, can be replaced by a second delay element connected to the input of the SELECTOR element. This delay element is not only simpler than the XOR it replaces, but also allows the Acon signal to anticipate the action of the SELECTOR element by as much as the combined delay of the source of the Dcon signal and the associated Control Place combinational logic 48 (see FIG. 2b).

Figure 13:
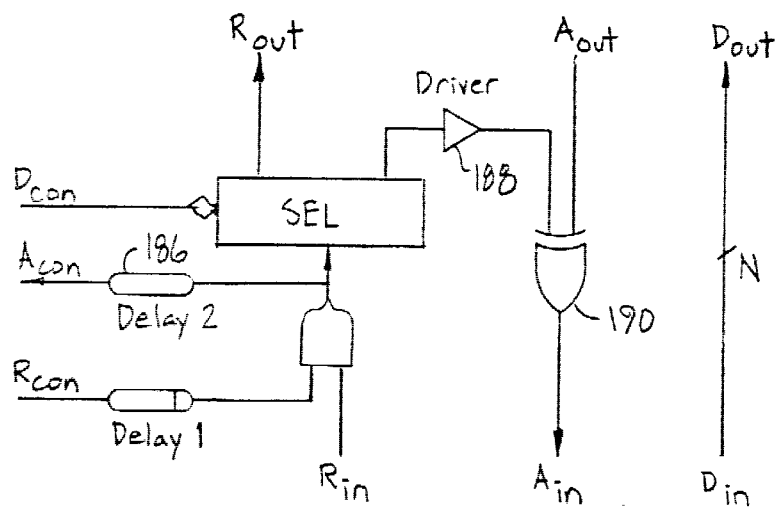
FIG. 13 is a diagram which illustrates a preferred embodiment of the Output Control Port module.
Figure 14:
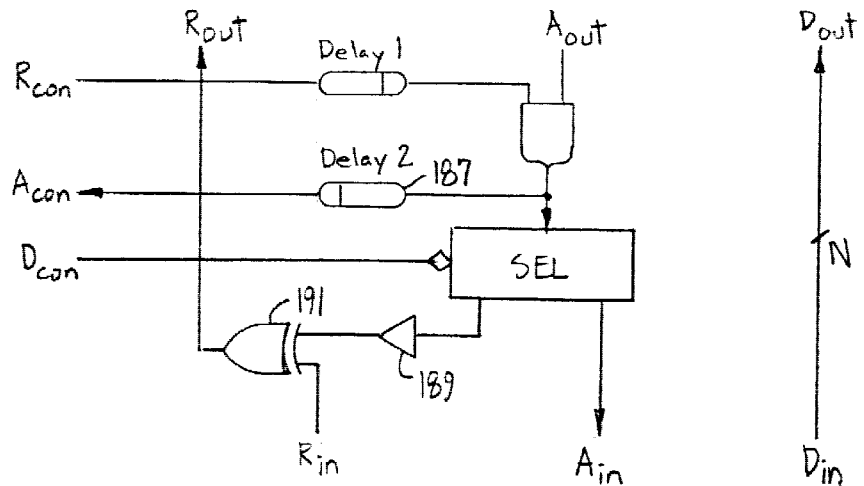
FIG. 14 is a diagram which illustrates a preferred embodiment of the Input Control Port module.

Both the preferred embodiment of the Output Control Port, shown in FIG. 13, and the preferred embodiment of the Input Control Port, shown in FIG. 14, illustrate this use of element delay 186,187. Further, not illustrated, we choose transistor sizes in the SELECTOR element and in the remaining XOR to make the critical routes from Rin to Rout and from Aout to Ain as fast as possible. This sacrifices speed in the loop from Rin to Ain, where speed is not as essential. The driver circuits 188, 189 help in speeding these two critical routes by producing additional current at the input to the XOR 190, 191 in the SELECTOR element's first output, while reducing the load on the SELECTOR element's second output.

One important concept described here is the control of one pipeline by data items carried in another pipeline. For example this is shown in the example discussed in conjunction with FIG. 9. The Input Control Port and Output Control Port modules of FIGS. 7, 8, 13, and 14 also embody this idea. Furthermore, it should be appreciated that while a simple system with only two branches and a limited number of Input Control Ports and Output Control Ports is illustrated, pipeline systems of any complexity can be built. It should also be noted that while the system of FIG. 9 illustrates the control of one pipeline by data items carried in one other pipeline, suitable modification of the SELECTOR element and the Control Port modules will allow those skilled in the art to generalize the idea so as to embody the control of a plurality of pipelines by data items carried in a plurality of other pipelines.

Figure 15:
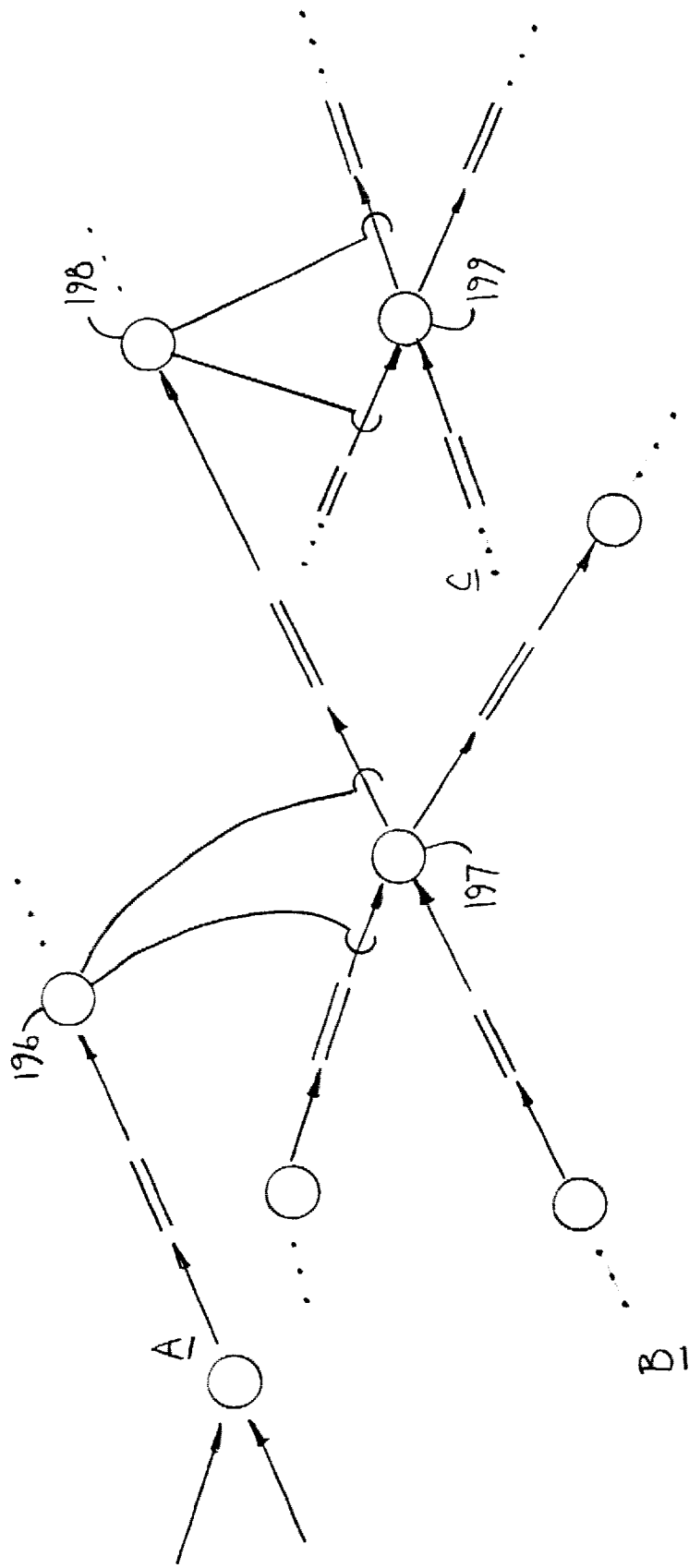
FIG. 15 is a diagram which illustrates multiple levels of control of one pipeline by data from another.

FIG. 15 illustrates how pipeline systems involving multiple levels of control are also possible. For example, consider the portion of a complex system. Such a system might use a pipeline A to control the actions of pipeline B, which in turn controls pipeline C. Thus, information in Place 196, a part of pipeline A, controls overwriting (or not) the values in Place 197, and allowing them (or not) to pass to Place 198, according to control bits present in Place 196. Further, pipeline B can control a third pipeline C, the resulting values in Place 198 control the disposition of data items in Place 199. Such multiple level use of these control systems, involving Input Control Ports and/or Output Control Ports at any level, may be extended to any desired depth.

Figure 16:
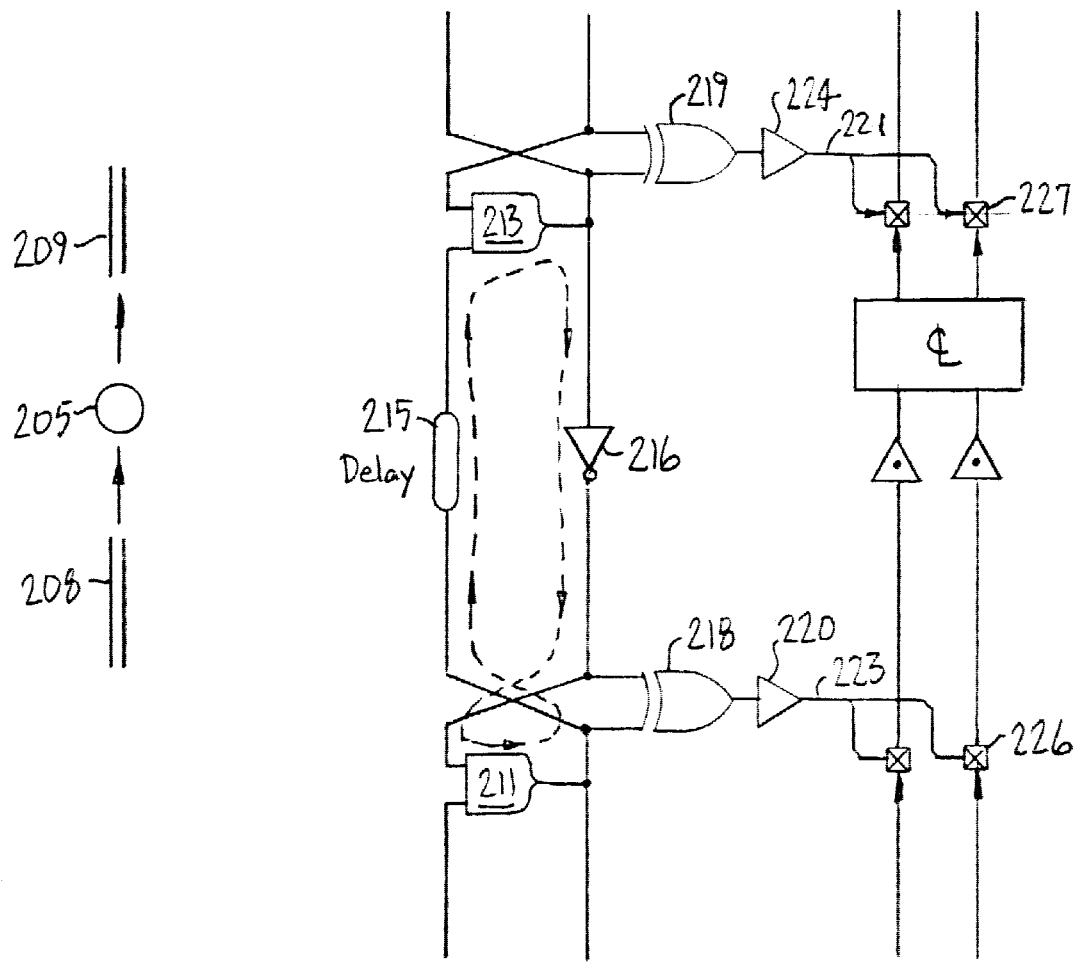
FIG. 16 is a diagram which illustrates an asynchronous control loop formed by a Place between two Paths.

Another concept using the techniques described above is the use of logic elements outside the closed request/acknowledge loops of asynchronous control systems. FIG. 16 illustrates a control loop where a single Place module 205 lies between two Path modules 208 and 209. Because only one interface of the Path modules and the Place modules need be used, the interface combining Muller C-elements shown in the Place and Path module implementations of FIGS. 2 and 4 are unnecessary and are omitted from FIG. 16. The dotted line indicates a control loop. XOR gates 218 and 219 as well as amplifier 220 and 221 are appendages to such loops.

The foregoing explanation describes the P**3 concept as embodied in this invention. The invention provides the ability to control flow in one pipeline from control information flowing in another pipeline, and permits placing the latch control logic, particularly the XOR, outside the closed loop of the asynchronous control system. The Control Port module controls flow in one pipeline from data flowing in another pipeline, while the Path module can use an XOR outside the closed loop asynchronous control.

The techniques described herein also enable an automatic conversion from P3 notation to implementation of circuits; that is, a P3 compiler. Because each icon in the P3 notation represents a specific circuit, moving from a P3 diagram to a complete circuit can be mechanized in a device or computer program; it is a compiler of circuits. To specify the data path, the P3 notation must be augmented with details of the combinational logic in each place and the wiring of the data paths linking modules. For one example, a P3 diagram quickly reveals whether or not parallel routes are balanced. (The two routes in FIG. 9 are unbalanced.) Although balance is not always desirable, it is always helpful to distinguish balance from imbalance. As another example, a P**3 diagram reveals how many values circulate in a closed loop, and thus reveals the logical latency forced upon the loop by initial conditions. FIG. 1a has one value circulating in a loop of three Places 12, 14, 19.

The techniques described also provide a unique set of modules themselves. The modules, as a set, fit together well, enabling easier generation of complex circuits. In particular it is easier to create designs in which one pipeline controls an independent pipeline. In addition the system of this invention enables significant parts of the control logic, namely the XOR, to lie outside the closed loops of the asynchronous control.

The foregoing has been a description of embodiments of the invention. It will be appreciated that numerous departures from the specific circuitry shown may be made without departing from the spirit of the invention, which is further defined in the appended claims and their equivalents. For example, the modules described here encode events as transitions, but other encodings are also possible.

What is claimed is:

1. Apparatus for processing information comprising:
   a junction node;
   a first pipeline connected to the junction node, the first pipeline comprising a plurality of place modules, each place module connected to a preceding place module through a path module;
   a second pipeline connected to the junction node, the second pipeline comprising a plurality of place modules, each place module connected to a preceding place module through a path module, each of the first and second pipelines supplying information to the junction node;

a third pipeline connected to receive information from the junction node, the third pipeline comprising a plurality of place modules, each place module connected to a preceding place module through a path module;

a command signal connected to be supplied to the junction node to control the flow of information from the junction node to the third pipeline, the command signal being supplied by one of the first pipeline, the second pipeline, and a fourth pipeline.

2. Apparatus as in claim 1 wherein each one of a plurality of the place modules in the first and second pipelines include apparatus for performing combinatorial logic on data supplied to that place module.

3. Apparatus as in claim 1 wherein the command signal causes at least one of: insertion of data into the third pipeline, deletion of data from the third pipeline, and steering of data from one of the first and second pipelines to the third pipeline.

4. Apparatus as in claim 1 wherein the place modules comprise:
a control part including:
a first pathway for request signals, the first pathway including a first Muller C-element having input terminals connected to receive the request signals and an output terminal connected to supply them to an element having a delay;
a second pathway for acknowledge signals, the second pathway including a second Muller C-element having input terminals connected to receive the acknowledge signals and supply them to an output terminal; and
a data part for performing an operation on data input signals, the data part including a third pathway for the data input signals, the third pathway including combinatorial logic connected to receive the data input signals and supply the results of the combinatorial logic to an output node.

5. Apparatus as in claim 1 wherein the path modules comprise:
a control part including:
a first pathway for request signals, the first pathway including a first Muller C-element having input terminals connected to receive the request signals and an output terminal connected to a second Muller C-element;
a second pathway for acknowledge signals, the second pathway including a third Muller C-element having input terminals connected to receive the acknowledge signals and supply them to an output terminal connected the second Muller-C element; and
a data part having input terminals connected to output terminals through pass gates, the pass gates being coupled to be controlled by an output terminal of the second Muller C-element and an output terminal of the third Muller C-element to control transfer of data from the input terminals to the output terminals.

6. Apparatus for processing information comprising:
a junction node;
a first pipeline connected to supply information to the junction node, the first pipeline comprising a plurality of place modules, each place module connected to a preceding place module through a path module;
a second pipeline connected to the junction node, the second pipeline comprising a plurality of place modules, each place module connected to a preceding place module through a path module, each of the first and second pipelines supplying information;

a third pipeline connected to the junction node, the third pipeline comprising a plurality of place modules, each place module connected to a preceding place module through a path module, each of the second and third pipelines receiving information from the junction node; and a command signal connected to be supplied to the junction node to control the flow of information from the junction node to each of the second and third pipelines, the command signal being supplied by one of the first pipeline and a fourth pipeline.

7. Apparatus as in claim 6 wherein each one of a plurality of the place modules in the first pipeline includes apparatus for performing combinatorial logic on data supplied to that place module.

8. Apparatus as in claim 6 wherein the command signal causes at least one of: insertion of data into at least one of the second and the third pipeline, deletion of data from at least one of the second and the third pipeline, and steering of data from the first pipeline into at least one of the second pipeline and third pipeline.

9. Apparatus as in claim 6 wherein the place modules comprise:
a control part including:
a first pathway for request signals, the first pathway including a first Muller C-element having input terminals connected to receive the request signals and an output terminal connected to supply them to an element having a delay;
a second pathway for acknowledge signals, the second pathway including a second Muller C-element having input terminals connected to receive the acknowledge signals and supply them to an output terminal; and
a data part for performing an operation on data input signals, the data part including a third pathway for the data input signals, the third pathway including combinatorial logic connected to receive the data input signals and supply the results of the combinatorial logic to an output node.

10. Apparatus as in claim 6 wherein the path modules comprise:
a control part including:
a first pathway for request signals, the first pathway including a first Muller C-element having input terminals connected to receive the request signals and an output terminal connected to a second Muller C-element;
a second pathway for acknowledge signals, the second pathway including a third Muller C-element having input terminals connected to receive the acknowledge signals and supply them to an output terminal connected the second Muller-C element; and
a data part having input terminals connected to output terminals through pass gates, the pass gates being coupled to be controlled by an output terminal of the second Muller C-element and an output terminal of the third Muller C-element to control transfer of data from the input terminals to the output terminals.

11. Apparatus as in claim 10 further comprising an exclusive OR logic element having input terminals connected to the output terminal of the second Muller C-element and the output terminal of the third Muller C-element, and having an output terminal connected to control the pass gates.

12. A system comprising:
a first pipeline including a first control path in which request signals and acknowledge signals flow in a control loop, the request signals flowing in one direction, and the acknowledge signals flowing in an opposite direction and a data path in which data flows;
a second pipeline including a second control path in which request signals and acknowledge signals flow in a control loop, the request signals flowing in one direction, and the acknowledge signals flowing in an opposite direction and a data path in which data flows, the first and the second pipelines being connected to a junction, the junction including
a control element disposed in the data path to regulate the flow of data therethrough; and
a control circuit external to the control element connected to provide signals to the control element and connected to the control loop of one of the first pipeline and the second pipeline to receive the request signals and the acknowledge signals from the control loop as those signals flow through the control path, and in response thereto control the control element.

13. A system as in claim 12 wherein the request and the acknowledge signals comprise event logic signals.

14. A system as in claim 13 wherein the date path comprises an asynchronous data path.

15. A system as in claim 12 wherein each of the first and the second pipelines include place modules comprising:
a control path for controlling transfer of data elements through the place module; and
a data path for performing a logical function upon data elements supplied to the data path.

16. A place module as in claim 15 wherein the data path comprises a combinatorial logic circuit for performing a logic operation upon the data elements supplied thereto.

17. A place module as in claim 16 wherein the control circuit comprises:
at least one request line connected to an input node of a Muller C-element; and
a delay element connected to an output node of the Muller C-element.

18. A system as in claim 15 wherein each of the first and the second pipelines further include path modules comprising:
a control path for controlling transfer of data elements through the path module;
a data path for transferring data elements from an input node through a control element to an output; and
a control circuit coupled between the control path and the control element for regulating flow of data elements through the data path.

* * * * *